(12) United States Patent
Tokumoto

(10) Patent No.: US 6,691,820 B2
(45) Date of Patent: Feb. 17, 2004

(54) TORQUE DETECTING APPARATUS AND ELECTRIC POWER STEERING APPARATUS

(75) Inventor: Yoshitomo Tokumoto, Nabari (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/368,558

(22) Filed: Feb. 20, 2003

(65) Prior Publication Data

US 2003/0121717 A1 Jul. 3, 2003

Related U.S. Application Data

(62) Division of application No. 09/903,810, filed on Jul. 13, 2001, now Pat. No. 6,543,571.

(30) Foreign Application Priority Data

Jul. 14, 2000 (JP) ........................................ 2000-214724

(51) Int. Cl.[7] ................................................. B62D 5/04
(52) U.S. Cl. ................... 180/446; 180/443; 73/862.333
(58) Field of Search ............................... 180/404, 443, 180/444, 445; 701/41, 42, 43; 73/862.325, 862.328, 862.331, 862.333; 318/432, 434; 324/207.18

(56) References Cited

U.S. PATENT DOCUMENTS

| | | |
|---|---|---|
| 4,660,671 A | 4/1987 | Behr et al. |
| 4,874,053 A | 10/1989 | Kimura et al. |
| 4,972,320 A | 11/1990 | Sugiura et al. |
| 5,578,767 A | 11/1996 | Chikaraishi et al. |
| 5,596,252 A | 1/1997 | Shimizu et al. |
| 5,796,014 A | 8/1998 | Chikaraishi et al. |
| 6,018,691 A | 1/2000 | Yamamoto et al. |
| 6,148,949 A | 11/2000 | Kobayashi et al. |
| 6,363,797 B1 | 4/2002 | Tokumoto |
| 6,390,228 B2 * | 5/2002 | Serizawa et al. ........... 180/403 |
| 6,543,571 B2 * | 4/2003 | Tokumoto ................... 180/446 |
| 2002/0036112 | 3/2002 | Tokumoto |

FOREIGN PATENT DOCUMENTS

| | | |
|---|---|---|
| DE | 100 01 346 A | 12/2000 |
| JP | 63-317702 | 12/1988 |
| JP | A2000 352502 | 12/2000 |
| JP | 2001133338 A | 5/2001 |
| WO | A1 062031 | 10/2000 |

* cited by examiner

Primary Examiner—Lesley D. Morris
Assistant Examiner—Daniel Yeagley
(74) Attorney, Agent, or Firm—Birch, Stewart, Kolasch & Birch, LLP

(57) ABSTRACT

A torque detecting apparatus which can detect steering torque applied on a steering shaft which connects a steering wheel and a steering mechanism from the steering wheel side and inverse input torque applied on the same from the steering mechanism side, and an electric power steering apparatus which can prevent deterioration of steering feeling when the inverse input torque acts, by driving and controlling the steering force assisting motor to cancel the inverse input torque. The torque detecting apparatus and the electric power steering apparatus judge that the inverse input torque is applied when a predetermined interrelation exists among a vehicle speed and angular velocities which are calculated at two positions distant in the axial direction of the steering shaft.

2 Claims, 6 Drawing Sheets

TORQUE DETECTING APPARATUS AND ELECTRIC POWER STEERING APPARATUS

This application is a divisional of application Ser. No. 09/903,810, filed on Jul. 13, 2001 U.S. Pat. No. 6,543,571 the entire contents of which are hereby incorporates by reference and for which priority is claimed under 35 U.S.C. §120; and this application claims priority of Application No. 2000-214724 filed on Jul. 14, 2000 in Japan under 35 U.S.C. §119.

BACKGROUND OF THE INVENTION

1. Field of the Invention

This invention relates to a torque detecting apparatus for detecting steering torque applied on a steering shaft for steering operation, and an electric power steering apparatus for driving and controlling a steering force assisting motor based on the steering torque detected by the torque detecting apparatus.

2. Description of the Prior Art

An electric power steering apparatus, which drives a steering force assisting motor based on detection result of steering torque applied on a steering wheel for steering operation and transmits turning effort from the motor to a steering mechanism to assist steering, can control assisting force characteristics according to a running state, such as vehicle speed and frequency of steering, more easily than a hydraulic power steering, which uses a hydraulic actuator as a source of assisting steering force. Such an advantage has recently invited an inclination to allow wider application of the electric power steering apparatus.

Such an electric power steering apparatus is under the necessity of detecting steering torque applied on the steering wheel. The detection is generally accomplished by detecting rotational angles at two positions of a steering shaft which are distant in the axial direction of the steering shaft, which connects the steering wheel and the steering mechanism. Steering torque can be calculated based on a difference between the two rotational angles detected at said two positions, since the difference corresponds to a torsion of the steering shaft generated in the course of steering operation.

The steering shaft is constructed by connecting an input shaft on the steering wheel side and an output shaft on the steering mechanism side through a torsion bar of a small diameter. Such a construction allows a large rotational angle difference to arise according to the torsion of the torsion bar between the input shaft and the output shaft, and accuracy of calculating steering torque can be increased by detecting rotational angles of the two shafts respectively.

The present applicant has proposed, in Unexamined Japanese Patent Publication No. 2000-352502, a torque detecting apparatus in an electric power steering apparatus which can preferably be used for detecting steering torque. Said torque detecting apparatus has sensor units respectively provided at connection parts of the input shaft and of the output shaft. The sensor units comprises magnetic targets, which are provided in peripheral direction of an object rotational axis and tilted approximately equally against the axial direction of the steering shaft, and magnetometric sensors (MR sensors), which are provided on the exterior of the magnetic targets opposing the same and generates output which changes as each target passes by.

In this construction, the magnetometric sensor in the sensor units outputs voltage, which changes, as each target passes by, lineally with a slope corresponding to the tilt of the targets set in peripheral direction of the input shaft and the output shaft. The rotational angles of the input shaft and the output shaft can be detected in non-contact mode based on the output from each corresponding magnetometric sensor. The steering torque applied on the input shaft by operating the steering wheel is thus calculated based on the difference between the rotational angles of the two shafts, which is obtained as an output difference between the magnetometric sensors corresponding to the input shaft and the output shaft.

For controlling the steering force assisting motor in the electric power steering apparatus, the magnitude of the steering torque applied on the steering wheel needs to be detected as well as the direction of the steering torque, namely, whether the steering is performed to the left or to the right. The torque detecting apparatus constructed as described above judges the direction of the steering torque by comparing the rotational angle of the input shaft and that of the output shaft. The electric power steering judges that the steering torque is applied in the direction in which the input shaft precedes the output shaft.

In addition to the proper input torque (steering torque) applied from the input shaft on the steering wheel side according to the steering operation, reaction force from road surface applied on a wheel for steering acts on the steering shaft of a running vehicle as an input torque (called "inverse input torque" in the following) from the output shaft on the steering mechanism side. For example, at straight driving without turning the steering wheel, when the vehicle runs on rough road surface and large inverse input torque is applied, the inverse input torque may be detected by the torque detecting apparatus constructed as described above.

Inverse input torque is applied such that the rotation of the output shaft side precedes that of the input shaft side, while the proper steering torque is applied such that the rotation of the input shaft side precedes that of the output shaft side. Consequently, in judging the torque direction based on the detecting result by the torque detecting apparatus, the inverse input torque is judged to be steering torque applied in the direction, in which the wheel for steering is energized by the action of the reaction force from the road surface. When the steering force assisting motor is driven according to such a torque detection, driving force of the motor is applied on the steering mechanism in the same direction as the inverse input torque, and the driver who is at the wheel feels such that the primary inverse input torque is promoted. The conventional art thus has a problem of causing a deterioration of a steering feeling.

BRIEF SUMMARY OF THE INVENTION

The present invention has been made to solve the problematic point mentioned above.

One object of the present invention is to provide a torque detecting apparatus for detecting steering torque applied on the steering shaft, which connects the steering wheel and the steering mechanism, from the steering wheel side, and inverse input torque applied on the steering shaft from the steering mechanism side, separately.

Another object of the invention is to provide an electric power steering apparatus which can prevent the deterioration of steering feeling when the inverse input torque acts, by driving the steering force assisting motor in a direction to cancel the inverse input torque, or by not driving the steering force assisting motor.

A torque detecting apparatus according to the present invention judges that inverse input torque is applied on a steering shaft which connects the steering wheel and the steering mechanism, when a predetermined interrelation exists among vehicle speed and two angular velocities which are calculated at two positions distant in the axial direction of the steering shaft. The torque detecting apparatus attempts to prevent inappropriate controlling operation by outputting torque of assistance force calculated in a predetermined way as follows. When the inverse input torque acts, the torque of assistance force is calculated by inverting the direction of the detected torque or by inverting the direction of torque obtained by multiplying the detected torque, or fixed zero.

An electric power steering apparatus according to the present invention attempts to prevent the deterioration of steering feeling caused by the action of the inverse input torque. The electric power steering apparatus detects the proper steering torque and the inverse input torque separately in the same way as the torque detecting apparatus, and, when the inverse input torque is detected, drives the steering force assisting motor in the opposite direction to the detected torque direction according to the torque of assistance force, which is output by the torque detecting apparatus, or does not drive the motor.

These and other objects, features and advantages of the invention will become more apparent upon a reading of the following detailed description and drawing.

DETAILED DESCRIPTION OF THE INVENTION

Hereinafter, the present invention is concretely described on the basis of the drawings which show the embodiments thereof.

Figure 1:
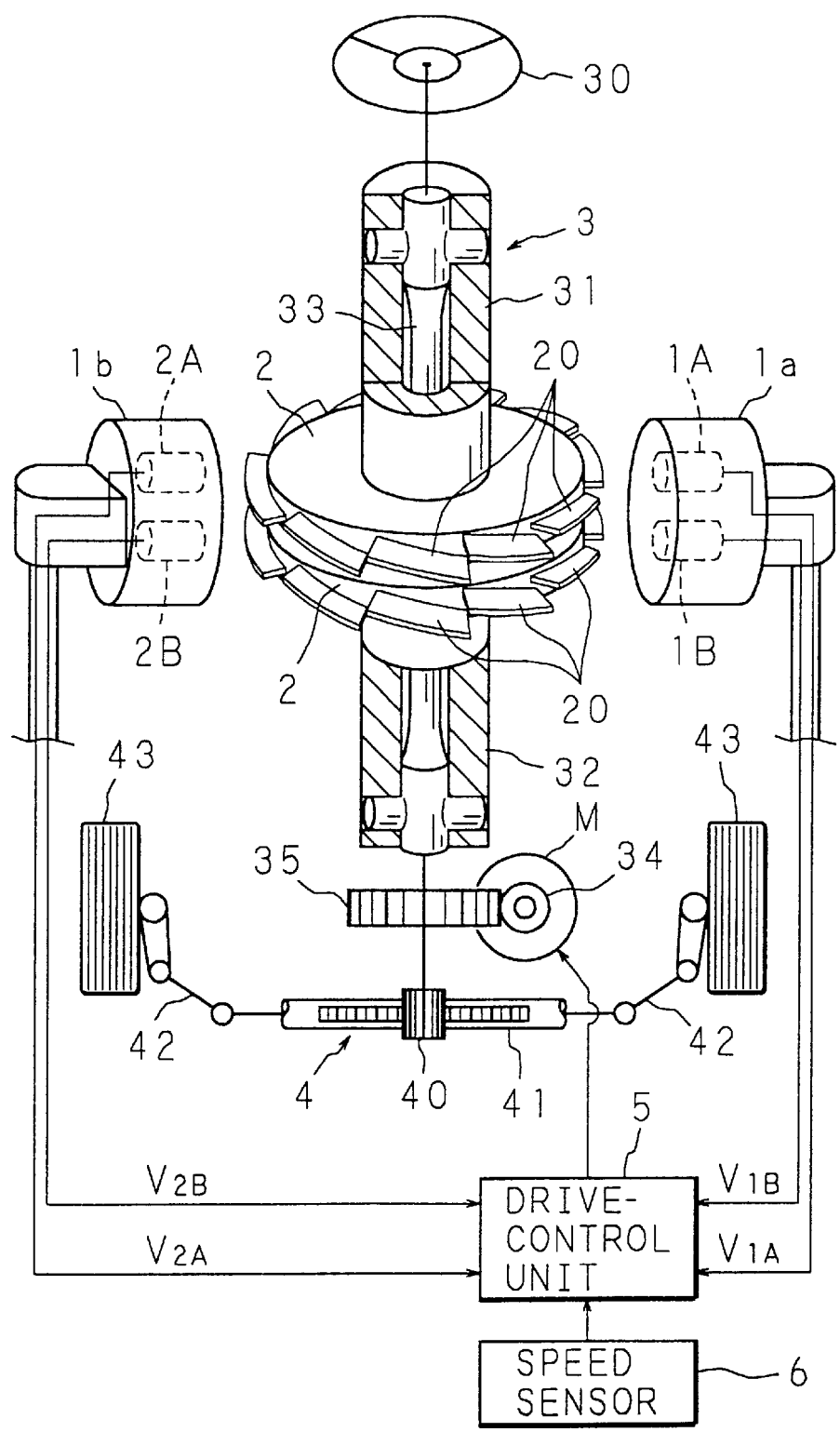
FIG. 1 is a schematic representation of an electric power steering apparatus provided with a torque detecting apparatus according to the present invention.

FIG. 1 is a schematic representation of an electric power steering apparatus provided with a torque detecting apparatus according to the present invention. As shown in the figure, an input shaft 31 connected at the upper end thereof to a steering wheel 30 for steering operation and an output shaft 32 connected to a pinion 40 of a steering mechanism 4 described below are connected through a torsion bar 33 of a small diameter to construct a steering shaft 3 which connects the steering wheel 30 and the steering mechanism 4.

The steering mechanism 4 is constructed as a steering mechanism of a rack and pinion type having the pinion 40 and a rack shaft 41 geared with the pinion 40. The rack shaft 41 is extended in right and left direction of a vehicle which is unshown and is connected to wheels for steering 43, 43 (wheels for steering are generally front wheels) through each of tie rods 42, 42 at the right and left ends thereof. In this construction, turning the steering wheel 30 generates the rotation of the pinion 40 and the rotation transmitted through the steering shaft 3 is then converted into axial directional movement of the rack shaft 41 geared with the pinion 40. The movement of the rack shaft 41 is transmitted to wheels for steering 43, 43 through the tie rods 42, 42, and the direction of the wheel 43, 43 is controlled.

The steering mechanism 4 is constructed as an electric power steering apparatus for assisting the steering operation mentioned above by a steering force assisting motor M. The steering force assisting motor M is provided in the middle of the steering shaft 3 and a worm 34 fitted to an output terminal of the motor M is geared with a worm wheel 35 which is fixed to the middle of the output shaft 32. In this construction, rotation of the motor M is transmitted to the output shaft 32 through the worm 34 and the worm wheel 35, and the torque is granted to the pinion 40 connected to the lower end of the output shaft 32. Steering is assisted according to said rotation.

A torque detecting apparatus according to the present invention is constructed in proximity to a connection part of the input shaft 31 and the output shaft 32 as described below, to detect the steering torque applied on the steering shaft 3 by the operation of the steering wheel 30.

A discoid target ring 2, which has integrally molded plurality of target gears 20, 20 . . . (FIG. 1 shows ten) thereon, is coaxially fixed to the input shaft 31 in proximity to the connection part with the output shaft 32. The target gears 20, 20 . . . are magnetic protrusions tilted at an approximately same angle in the same direction against the axial direction of the input shaft 31 to which the target ring 2 is fixed. The target gears 20, 20 . . . are arranged at regular intervals in a peripheral direction of the target ring 2.

The same target ring 2 is also fixed to the output shaft 32 in proximity to the connection part with the input shaft 31. The target ring 2 has, on the periphery thereof, plurality of target gears 20, 20 . . . tilted at an approximately same angle against the axial direction of the output shaft 32 to which the target ring 2 is fixed. The peripheral positions of the target gears 20, 20 . . . on the output shaft 32 are adjusted to the positions of the target gears 20, 20 . . . on the input shaft 31.

Two sensor boxes 1a, 1b are provided on the exterior of the target rings 2, 2, facing the arranged position of each set of target gears 20, 20 . . . from peripherally different positions. The sensor boxes 1a, 1b are fitted to a stable part such as a housing for supporting the input shaft 31 and the output shaft 32. A magnetometric sensor 1A facing the target gears 20, 20 . . . at the input shaft 31 side and a magnetometric sensor 1B facing the target gears 20, 20 . . . at the output shaft 32 side are disposed in the sensor box 1a, peripheral directions thereof being adjusted. Also, a magnetometric sensor 2A facing the target gears 20, 20 . . . at the input shaft 31 side and a magnetometric sensor 2B facing the target gears 20, 20 . . . at the output shaft 32 side are disposed in the sensor box 1b, peripheral directions thereof being adjusted.

The magnetometric sensors 1A, 1B, 2A, 2B are constructed to change output voltage according to the change of a peripheral magnetic field, using an element which changes an electrical characteristic thereof by the action of the magnetic field, such as a magnetoresistance effect element (MR element). Outputs $V_{1A}$, $V_{1B}$, $V_{2A}$, $V_{2B}$ of the magnetometric sensors 1A, 1B, 2A, 2B are transmitted from the sensor boxes 1a, 1b to a drive-control unit 5 comprising a microprocessor.

Figure 2:
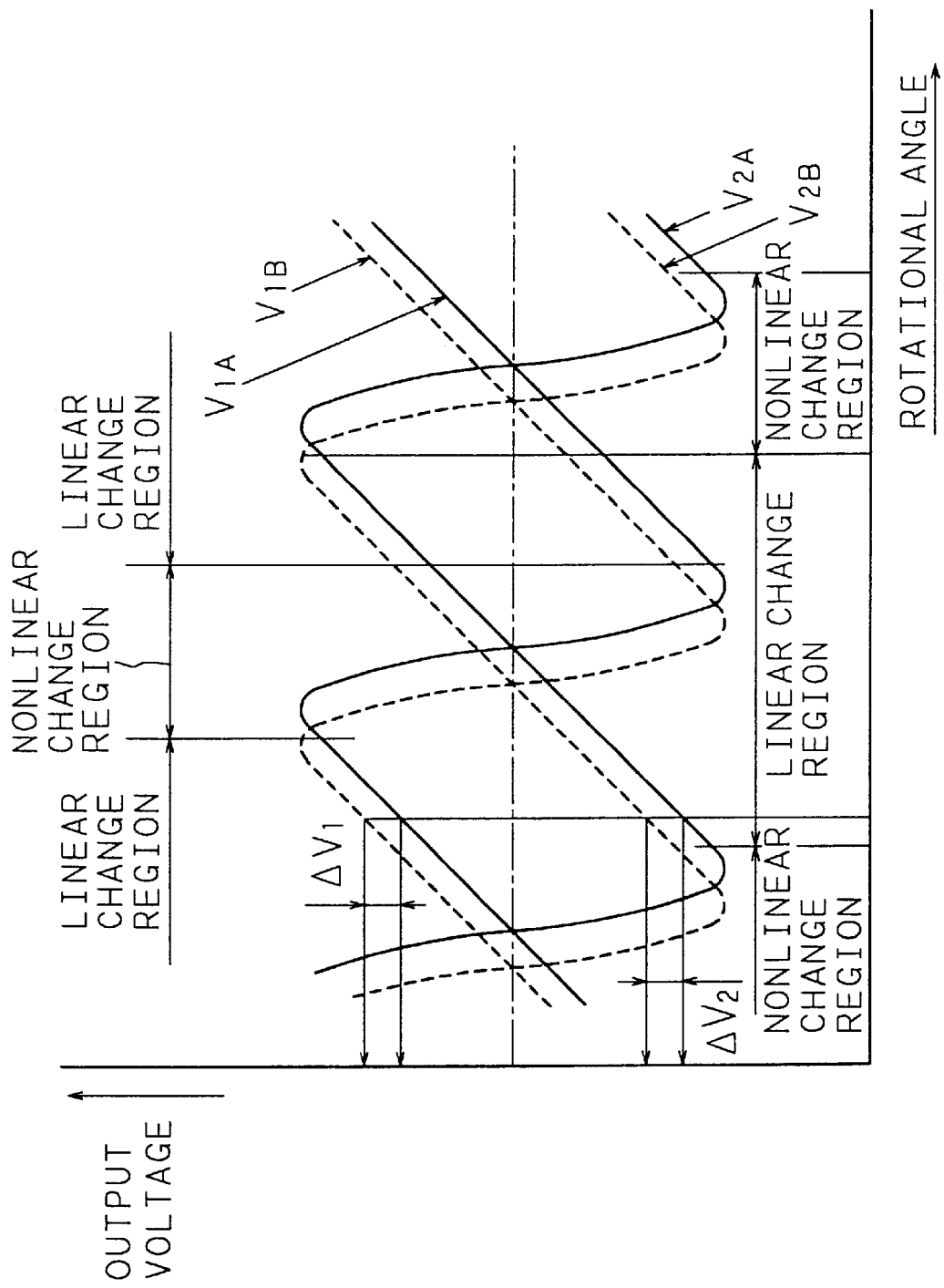
FIG. 2 is a graph showing an example of output voltage change of a magnetometric sensor.

FIG. 2 is a graph showing an example of output voltage change of magnetometric sensors 1A, 1B, 2A, 2B. The axis of abscissas shows a rotational angle of the input shaft 31 or the output shaft 32. A full line in the figure shows the output voltage $V_{1A}$, $V_{2A}$ of the magnetometric sensors 1A, 2A at the input shaft 31 side, while a broken line in the figure shows the output voltage $V_{1B}$, $V_{2B}$ of the magnetometric sensors 1B, 2B at the output shaft 32 side.

As mentioned above, the target gears 20, 20 . . . , which the magnetometric sensors 1A, 1B, 2A, 2B face, are magnetic protrusions tilted at an approximately same angle in the same direction against the axial direction of the input shaft 31 and the output shaft 32, and a discontinuous part exists between each two target gears 20, 20. So, when the input shaft 31 and the output shaft 32 rotates on an axis thereof, each of magnetometric sensors 1A, 1B, 2A, 2B outputs a voltage signal which changes linearly according to the change of the rotational angle of the input shaft 31 or the output shaft 32 when corresponding target gears 20, 20 . . . pass by, and outputs a voltage signal which changes nonlinearly according to the change of said rotational angle when the discontinuous parts pass by.

As a result, the output voltage of the magnetometric sensors 1A, 1B, 2A, 2B includes a region in which the output voltage changes linearly when each target gear 20 passes (a linear change region) and a region in which the output voltage changes nonlinearly when the discontinuous part between target gears 20, 20 passes (a nonlinear change region), the linear change region and the nonlinear change region showing up reciprocally and repeatedly as shown in FIG. 2. A period of the repetition of the linear change region and the nonlinear change region corresponds to the number of the target gears 20, 20 . . . arranged on the periphery of the target ring 2. When ten target gears 20, 20 . . . are arranged on the periphery of the target ring 2, arises a repetition with a period corresponding to the rotational angle of 36° (=360°/10) of the input shaft 31 or the output shaft 32.

The output voltages $V_{1A}$, $V_{2A}$ of the magnetometric sensors 1A, 2A corresponds to the rotational angle of the input shaft 31 provided with the target gears 20, 20 . . . which the sensors 1A, 2A face, while the output voltages $V_{1B}$, $V_{2B}$ of the magnetometric sensors 1B, 2B correspond to the rotational angle of the output shaft 32 provided with the target gears 20, 20 . . . which the sensors 1B, 2B face. A difference $\Delta V_1$ between the output voltage $V_{1A}$ of the magnetometric sensor 1A and the output voltage $V_{1B}$ of the magnetometric sensor 1B (=$V_{1A}-V_{1B}$), or a difference $\Delta V_2$ between the output voltage $V_{2A}$ of the magnetometric sensor 2A and the output voltage $V_{2B}$ of the magnetometric sensor 2B (=$V_{2A}-V_{2B}$) corresponds to displacement amount in the peripheral direction (relative angle displacement) which arises between the target gears 20, 20 . . . at the input shaft 31 side and the target gears 20, 20 . . . at the output shaft 32 side. The relative angle displacement corresponds to torsion amount of a torsion bar 33 connecting the input shaft 31 and the output shaft 32, generated by the action of the steering torque applied on the input shaft 31. Consequently, the steering torque applied on the input shaft 31 can be calculated based on the difference between the output voltages $\Delta V_1$ or $\Delta V_2$.

Such calculation of the steering torque is performed at the drive-control unit 5 to which the output voltages of the magnetometric sensors 1A, 1B, 2A, 2B are granted. Calculation steps are fully described in the Unexamined Japanese Patent Publication No. 2000-352502 by the present applicant and omitted here. In short, the magnitude of the steering torque is calculated based on an absolute value of the difference between the output voltages $\Delta V_1$ or $\Delta V_2$, and a direction of the steering torque is judged based on the plus and minus sign of the $\Delta V_1$ or $\Delta V_2$.

Two pairs of magnetometric sensors 1A, 2A and 1B, 2B are arranged on the exterior of the target gears 20, 20 . . . at the input shaft 31 side and the output shaft 32 side to avoid outputting incorrect steering torque using an unreliable output at the nonlinear change region shown in FIG. 2. Two magnetometric sensors 1A, 1B in one sensor box 1a and two magnetometric sensors 2A, 2B in the other sensor box 1b are set with phases thereof shifted in the peripheral direction. In this construction, when one pair of outputs ($V_{1A}$, $V_{1B}$) are in the nonlinear change region, the other pair of outputs ($V_{2A}$, $V_{2B}$) are in the linear change region. One pair, the outputs of which are in the linear change region, is selected from the magnetometric sensors 1A, 1B and the magnetometric sensors 2A, 2B, and steering torque is calculated based on the output difference of the selected pair, at the drive-control unit 5.

The output from the drive-control unit 5 is transmitted to the steering force assisting motor M which is provided in the middle of the output shaft 32 as mentioned above. The drive-control unit 5 basically assists steering by driving the motor M to generate turning effort in the same direction as the calculated steering torque, according to the magnitude of the steering torque. As described above, the turning effort of the motor M is transmitted to the output shaft 32 through the worm 34 and the worm wheel 35. Steering assistance is achieved when the turning effort is applied to the pinion 40 disposed at the lower end of the output shaft 32.

However, torque calculation is performed not only for the proper steering torque applied from the input shaft 31 side according to the operation of the steering wheel 30 but also for the inverse input torque applied from the output shaft 32 side according to the reaction force from the road surface to the wheels for steering 43, 43 as mentioned above. When the steering force assisting motor is driven based on the calculated inverse input torque, the inverse input torque is promoted by the turning effort which is applied on the steering mechanism by the motor M. Such a promotion may cause a deterioration of steering feeling.

The drive-control unit 5 is constructed to discriminate whether an output voltage transmitted from the magnetometric sensors 1A, 1B, 2A, 2B is an output voltage generated by the proper steering torque or an output voltage generated by the inverse input torque, and to drive and control the motor M according to the discrimination result. Output from a speed sensor 6 for detecting vehicle speed is also applied to the input side of the drive-control unit 5. The vehicle speed detected by the speed sensor 6 is used for the torque discrimination.

Figure 3:
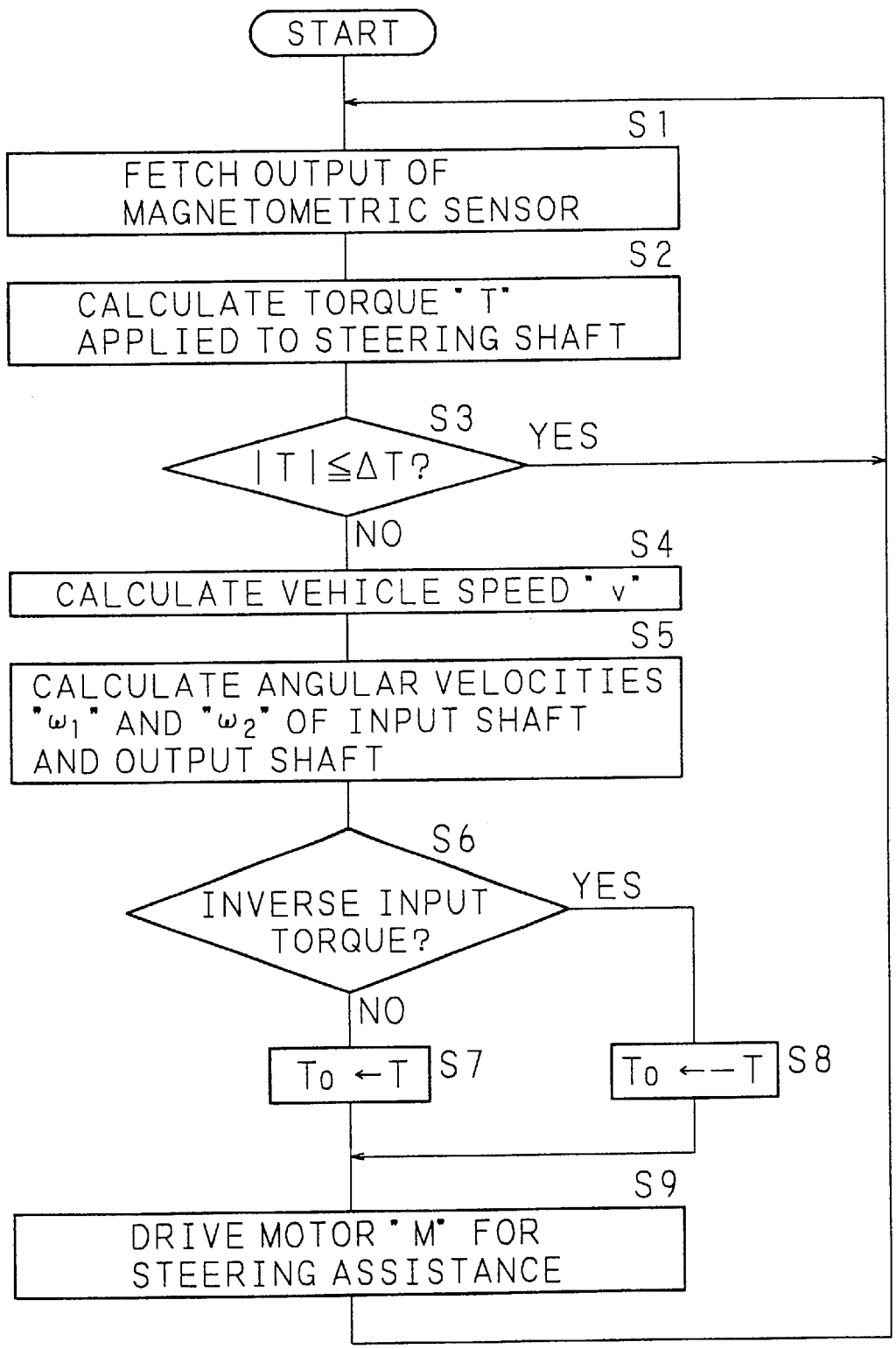
FIG. 3 is a flow chart showing operational content of a drive-control unit according to Example 1.

FIG. 3 is a flow chart showing the operational content of a drive-control unit 5 according to Example 1. The drive-control unit 5 starts operation on response to power supply by turning a key switch on, and fetches the output voltage $V_{1A}$, $V_{1B}$ of the magnetometric sensors 1A, 1B and the output voltage $V_{2A}$, $V_{2B}$ of the magnetometric sensors 2A, 2B, for a predetermined sampling period (STEP 1). The drive-control unit 5 calculates torque T applied on the steering shaft 3 based on an output difference $\Delta V_1$ or $\Delta V_2$ which is in a linear change region.

The drive-control unit 5 checks whether the torque T calculated in STEP 2 is within a predetermined dead zone $\Delta T$ (STEP 3). When the calculated torque T is within the dead zone $\Delta T$, the procedure is returned to STEP 1 without performing steps described below, and fetches the next output voltage.

When the calculated torque T is beyond the dead zone $\Delta T$, the drive-control unit 5 fetches an output from the speed sensor 6 connected to the input side, calculates existing vehicle speed (STEP 4), and calculates angular velocities $\omega_1$ and $\omega_2$ of the input shaft 31 and the output shaft 32 based on the output voltages of the magnetometric sensors used for calculating the steering torque, e.g. the output voltages $V_{1A}$, $V_{1B}$ of the magnetometric sensors 1A, 1B (STEP 5). By applying such a calculation result and the vehicle speed to an predetermined map, the drive-control unit 5 discriminates whether the calculated torque T is steering torque applied from the steering wheel 30 side or inverse input torque applied from the steering mechanism 4 side (STEP 6).

The output voltages $V_{1A}$, $V_{1B}$ of the magnetometric sensors 1A, 1B correspond to the rotational angles of the input shaft 31 and the output shaft 32, which the magnetometric sensors 1A, 1B are set to face, and the angular velocities $\omega_1$ and $\omega_2$ are readily calculated by differentiating the output voltages $V_{1A}$, $V_{1B}$ by time.

Figure 4:
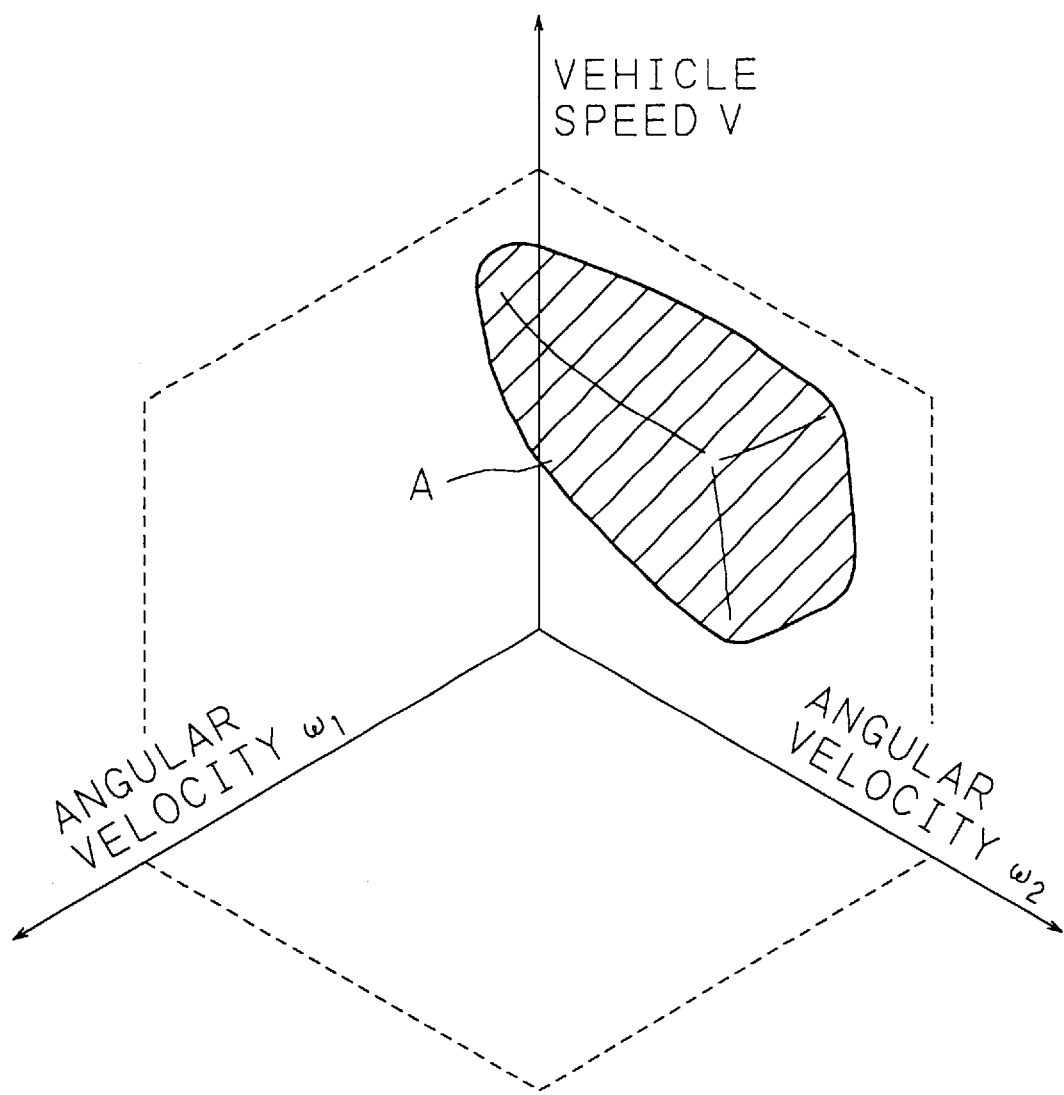
FIG. 4 is a view illustrating an example of a discriminant map for discriminating calculated torque.

FIG. 4 is a view illustrating an example of a discriminant map for discriminating the torque T calculated in STEP 6. As shown in the figure, the discriminant map expresses, on three-dimensional coordinate axes, three variables: an angular velocity of the input shaft 31; an angular velocity of the output shaft 32; and the vehicle speed. The discrimination is performed by applying a state point decided with a combination of the angular velocities $\omega_1$ and $\omega_2$ calculated in STEP 5 and the vehicle speed v detected in STEP 4 to a predetermined map, and checking whether or not the state point is within an inverse input region A which is hatched in the figure, for example. When the state point is beyond the inverse input region A, the calculated torque T is discriminated to be steering torque applied on the steering wheel 30 for steering, while when the state point is within the inverse input region A, the calculated torque T is discriminated to be inverse input torque applied from the steering mechanism 4 side by the action of disturbance force such as the reaction force from the road surface.

The inverse input region A covers cases where the vehicle speed v is relatively high and the angular velocity $\omega_2$ of the output shaft 32 side is greater than the angular velocity $\omega_1$ of the input shaft 31 side. When inverse input torque is generated by disturbance force such as reaction force from the road surface, the output shaft 32 rotates ahead of the input shaft 31 in a direction of the inverse input torque. The output shaft 32 also rotates ahead of the input shaft 31 when steering torque is generated by turning the steering wheel 30 in the opposite direction.

A difference between the two situations mentioned above is: when steering torque acts, the angular velocity of the input shaft 31 is greater than the angular velocity of the output shaft 32; while when inverse input torque acts, the angular velocity of the output shaft 32, which is an input side of the inverse input torque, is greater than the angular velocity of the input shaft 31. The inverse input region A set based on the difference enables the discrimination of the detected torque T.

The inverse input region A is set only for the cases where the vehicle speed is high because deterioration of steering feeling caused by the inverse input torque comes to the front only at high vehicle speed driving. It is preferable that a practical inverse input region A is decided on reference to a result of driving test carried on an actual vehicle.

When the calculated torque T is discriminated to be steering torque in STEP 6, the calculated torque T is set as torque of assistance force $T_o$ (STEP 7), while when the calculated torque T is discriminated to be inverse input torque, torque with an opposite sign to the calculated torque T is set as torque of assistance force $T_o$ (STEP 8). The drive-control unit 5 gives an instruction for operation to the steering force assisting motor M and drives the motor M, to generate assistance force in the direction of the torque of assistance force $T_o$ (STEP 9). The procedure is then returned to STEP 1.

In steps described above, when inverse input torque acts, the steering force assisting motor M is driven in a direction to cancel the inverse input torque. At straight driving without turning the steering wheel, for example, such motor drive softens bodily sensation of the inverse input torque by the action of disturbance force from the road surface. The above mentioned steps thus realize satisfactory steering feeling.

Figure 5:
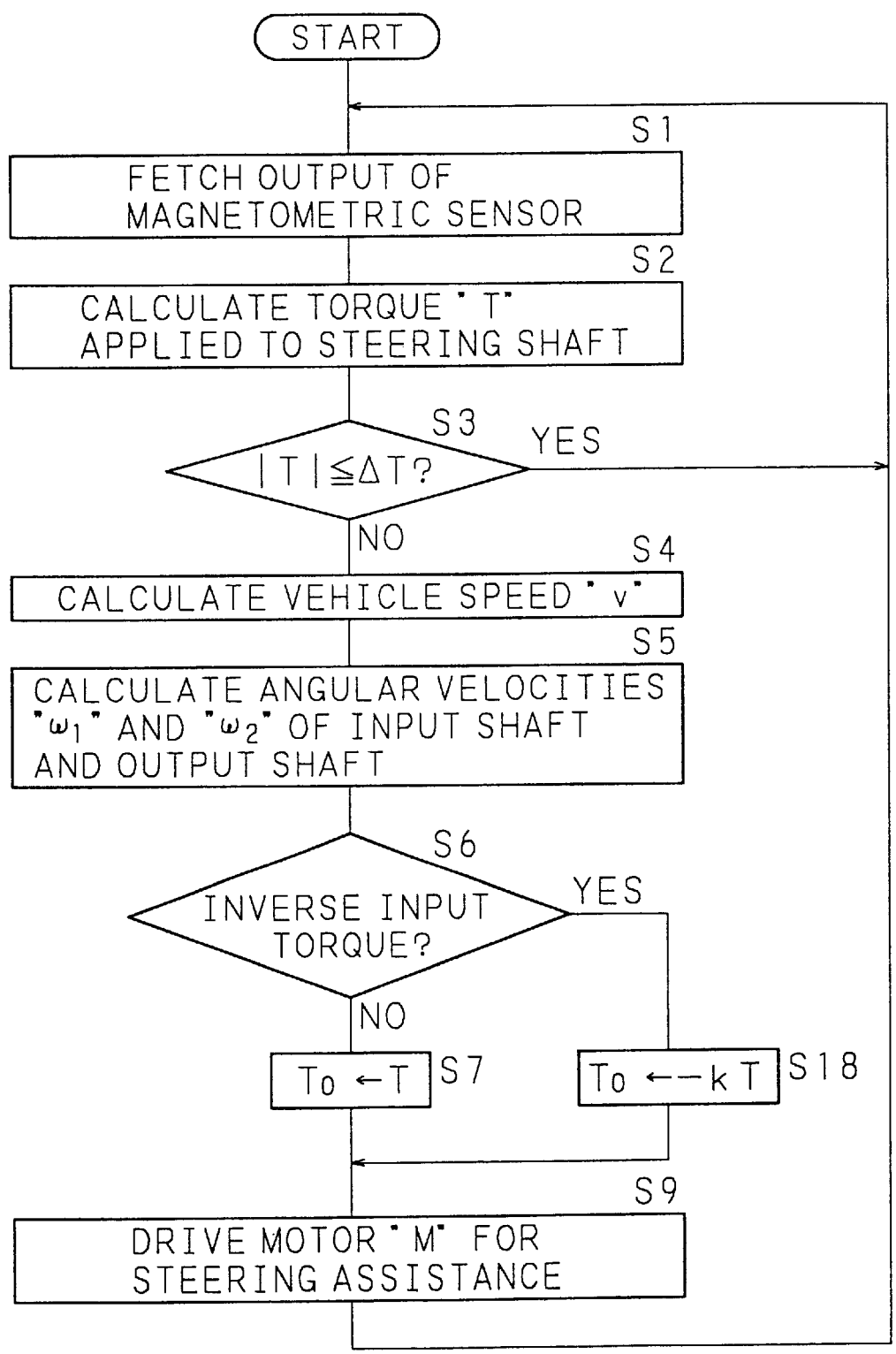
FIG. 5 is a flow chart showing operational content of a drive-control unit according to Example 2.

FIG. 5 is a flow chart showing the operational content of a drive-control unit 5 according to Example 2. In FIG. 5, like step numbers are used to refer to like steps shown in FIG. 3. At a drive-control unit 5 according to Example 2, torque of assistance force $T_o$ is decided by multiplying the calculated torque T by a coefficient k besides inverting the sign of the calculated torque T (STEP 18) when inverse input torque is detected. The cancellation of the inverse input torque is controlled to be positive or negative by changing the coefficient k.

Figure 6:
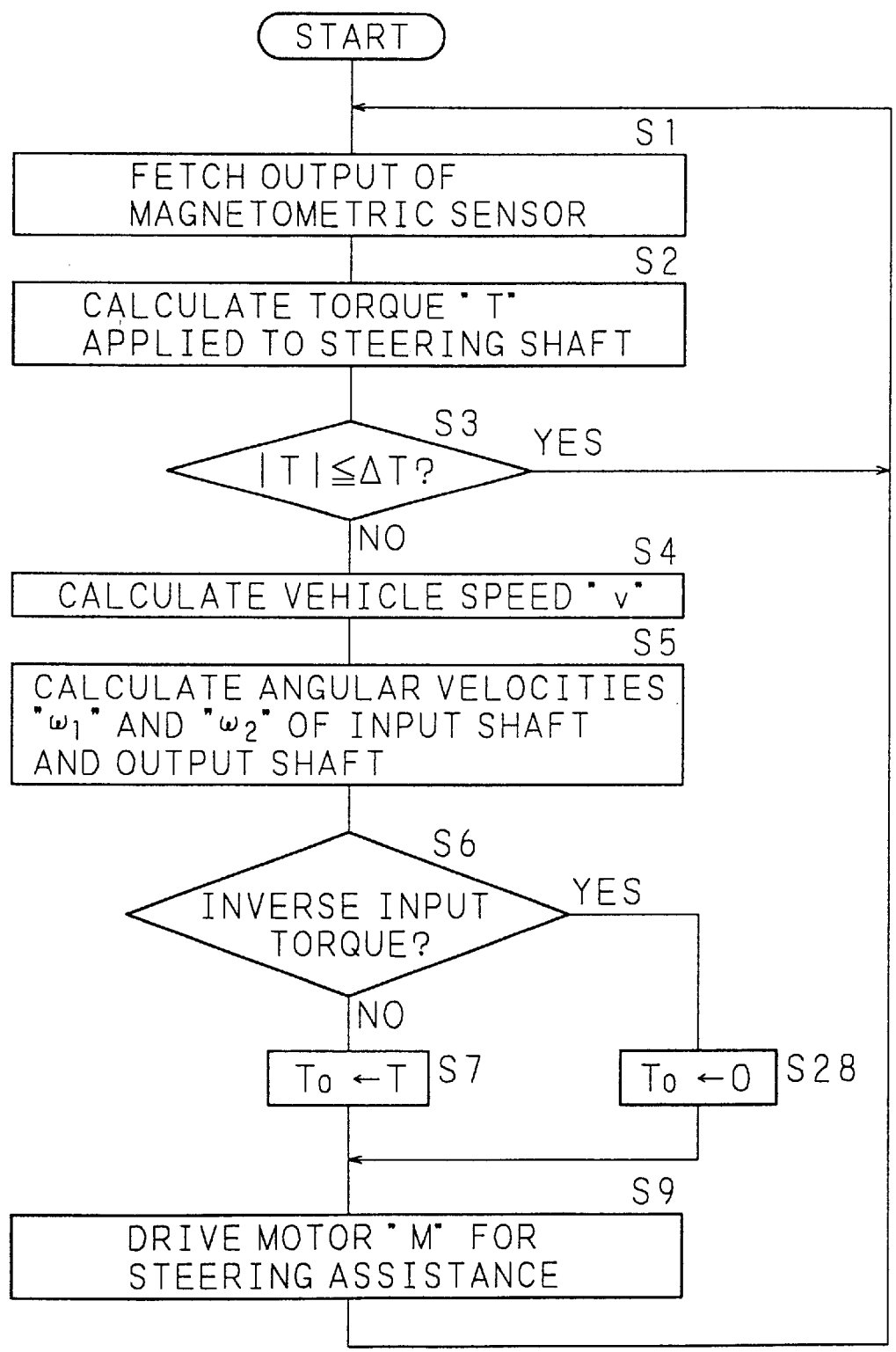
FIG. 6 is a flow chart showing operational content of a drive-control unit according to Example 3.

FIG. 6 is a flow chart showing the operational content of a drive-control unit 5 according to Example 3. In FIG. 6, like step numbers are used to refer to like steps shown in FIG. 3. At a drive-control unit 5 according to Example 3, torque of assistance force $T_o$ is always set at zero (STEP 28) when inverse input torque is detected. The steering force assisting motor M is thus not driven when inverse input torque acts.

Though a torque detecting apparatus proposed in the Unexamined Japanese Patent Publication No. 2000-352502 by the present applicant is used in above embodiments, the present invention is applicable to the all torque detecting apparatus which are constructed to calculate steering torque based on a difference between rotational angles detected respectively at two positions on the steering shaft 3.

It is further understood by those skilled in the art that the foregoing description is a preferred embodiment of the disclosed device and that various changes and modifications may be made in the invention without departing from the spirit and scope thereof.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A torque detecting apparatus, comprising:

a first rotational angle sensor and a second rotational angle sensor for detecting rotational angles of a steering shaft, which connects a steering mechanism and a steering wheel of a vehicle, at two positions distant in axial direction of the steering shaft;

torque calculating means for calculating a magnitude and a direction of steering torque applied on the steering wheel, based on a difference between the rotational angles detected by the first rotational angle sensor and the second rotational angle sensor;

a speed sensor for detecting a vehicle speed;

angular velocity calculating means for calculating angular velocities of the steering shaft at the respective detection positions thereof, based on detection results of the first rotational angle sensor and the second rotational angle sensor;

discrimination means for discriminating whether or not a predetermined interrelation exists among the angular velocities calculated by the angular velocity calculating means and the vehicle speed detected by the speed sensor; and means for setting a torque of assistance force at zero, when the predetermined interrelation is discriminated to exist by the discrimination means.

2. A torque detecting apparatus, comprising:

a first rotational angle sensor and a second rotational angle sensor for detecting rotational angles of a steering shaft, which connects a steering mechanism and a steering wheel of a vehicle, at two positions distant in axial direction of the steering shaft;

a torque calculator for calculating a magnitude and a direction of steering torque applied on the steering wheel, based on a difference between the rotational angles detected by the first rotational angle sensor and the second rotational angle sensor;

a speed sensor for detecting a vehicle speed;

an angular velocity calculator for calculating angular velocities of the steering shaft at the respective detection positions thereof, based on detection results of the first rotational angle sensor and the second rotational angle sensor;

a discrimination unit for discriminating whether or not a predetermined interrelation exists among the angular velocities calculated by the angular velocity calculator and the vehicle speed detected by the speed sensor; and a control unit for setting a torque of assistance force at zero, when the predetermined interrelation is discriminated to exist by the-discrimination unit.

* * * * *